(12) United States Patent
Fan et al.

(10) Patent No.: US 11,443,251 B2
(45) Date of Patent: Sep. 13, 2022

(54) METHOD AND DEVICE FOR PREDICTING TRAFFIC

(71) Applicant: KOUBEI HOLDING LIMITED, Grand Cayman (KY)

(72) Inventors: Chi Fan, Hangzhou (CN); Chaofeng Meng, Hangzhou (CN); Han Luo, Hangzhou (CN); Yihuan Sui, Hangzhou (CN); Fangyu Dou, Hangzhou (CN)

(73) Assignee: KOUBEI HOLDING LIMITED, Grand Cayman (KY)

( * ) Notice: Subject to any disclaimer, the term of this patent is extended or adjusted under 35 U.S.C. 154(b) by 369 days.

(21) Appl. No.: 16/463,920

(22) PCT Filed: Nov. 21, 2017

(86) PCT No.: PCT/CN2017/112069
§ 371 (c)(1),
(2) Date: May 24, 2019

(87) PCT Pub. No.: WO2018/095308
PCT Pub. Date: May 31, 2018

(65) Prior Publication Data
US 2020/0074357 A1   Mar. 5, 2020

(30) Foreign Application Priority Data

Nov. 25, 2016   (CN) .......................... 201611055796.6

(51) Int. Cl.
*G06Q 10/00*   (2012.01)
*G06Q 10/04*   (2012.01)
(Continued)

(52) U.S. Cl.
CPC ......... *G06Q 10/04* (2013.01); *G06Q 10/0631* (2013.01); *G06Q 30/0202* (2013.01); *G06Q 50/12* (2013.01)

(58) Field of Classification Search
CPC . G06Q 10/04; G06Q 10/0631; G06Q 30/0202
(Continued)

(56) References Cited

U.S. PATENT DOCUMENTS

2004/0260769 A1   12/2004 Yamamoto
2005/0154560 A1*   7/2005 Fitzpatrick ............. G06Q 50/12
                                                        702/182
(Continued)

FOREIGN PATENT DOCUMENTS

CN   102111284 A   6/2011
CN   102711177 A   10/2012
(Continued)

OTHER PUBLICATIONS

International Search Report, PCT/CN2017/112069, dated Feb. 27, 2018, 5 pages.
(Continued)

*Primary Examiner* — Rokib Masud
(74) *Attorney, Agent, or Firm* — McCoy Russell LLP

(57) ABSTRACT

A method and apparatus for predicting traffic, comprising: determining time at which payment times for a first service reaches a peak as designated time; determining a peak of payment times for a second service in history as a historical peak according to a saved historical record; and predicting the actual traffic of the second service at the designated time according to the historical peak, wherein the first service and the second service belong to the same type of services, the execution manner of the first service is different from that of the second service, the service execution time of the first service is shorter than a preset duration, and the service execution time of the second service is longer than the preset duration. The present application can provide a more accurate reference for the operation and maintenance procedure of the server.

10 Claims, 3 Drawing Sheets

(51) Int. Cl.
*G06Q 30/02* (2012.01)
*G06Q 10/06* (2012.01)
*G06Q 50/12* (2012.01)

(58) Field of Classification Search
USPC .......................................................... 705/15
See application file for complete search history.

(56) References Cited

U.S. PATENT DOCUMENTS

| | | | | |
|---|---|---|---|---|
| 2013/0166347 | A1* | 6/2013 | Scotto | G06Q 30/0204 705/7.29 |
| 2015/0261195 | A1 | 9/2015 | Kami | |

FOREIGN PATENT DOCUMENTS

| | | | | |
|---|---|---|---|---|
| CN | 102819768 | A | 12/2012 | |
| CN | 103490956 | A | 1/2014 | |
| CN | 103984993 | A | 8/2014 | |
| CN | 104182801 | A | 12/2014 | |
| CN | 104424294 | A | 3/2015 | |
| CN | 104504595 | A | 4/2015 | |
| CN | 104581779 | A | 4/2015 | |
| CN | 104599092 | A | 5/2015 | |
| CN | 104616065 | A | 5/2015 | |
| CN | 104616086 | A | 5/2015 | |
| CN | 105719019 | A | 6/2016 | |
| CN | 106063204 | A | 10/2016 | |
| CN | 107092973 | A | 8/2017 | |
| CN | 107092973 | B * | 5/2018 | ........... G08G 1/0129 |
| JP | 5606214 | B2 | 10/2014 | |
| WO | 0161594 | A2 | 8/2001 | |

OTHER PUBLICATIONS

Written Opinion, PCT/CN2017/112069, dated Feb. 27, 2018, 5 pages.
Yun, X. et al., "Research on Mobile Communication Services Prediction Methods," Post and Telecommunications Design Technology, Feb. 20, 2011, 5 pages. (Submitted with English Abstract).
Zhou, J. et al., "Catering Industry Short-term Passenger Flow Forecasting Method," Journal of Tongji University (Natural Science), vol. 42 No. 3, Mar. 31, 2014, 6 pages. (Submitted with English Abstract).
State Intellectual Property Office of the People's Republic of China, Office Action and Search Report Issued in Application No. 201611055796.6, dated Mar. 5, 2018, 5 pages. (Submitted with Machine/Partial Translation).
State Intellectual Property Office of the People's Republic of China, Office Action and Search Report Issued in Application No. 201810437059.5, dated Apr. 19, 2019, 12 pages. (Submitted with Machine/Partial Translation).
State Intellectual Property Office of the People's Republic of China, Office Action and Search Report Issued in Application No. 201810437059.5, dated Oct. 9, 2019, 11 pages. (Submitted with Machine/Partial Translation).
State Intellectual Property Office of the People's Republic of China, Office Action and Search Report Issued in Application No. 201810613547.7, dated May 7, 2020, 11 pages. (Submitted with Machine/Partial Translation).
State Intellectual Property Office of the People's Republic of China, Office Action and Search Report Issued in Application No. 201810613547.7, dated Nov. 26, 2020, 16 pages. (Submitted with Machine/Partial Translation).

* cited by examiner

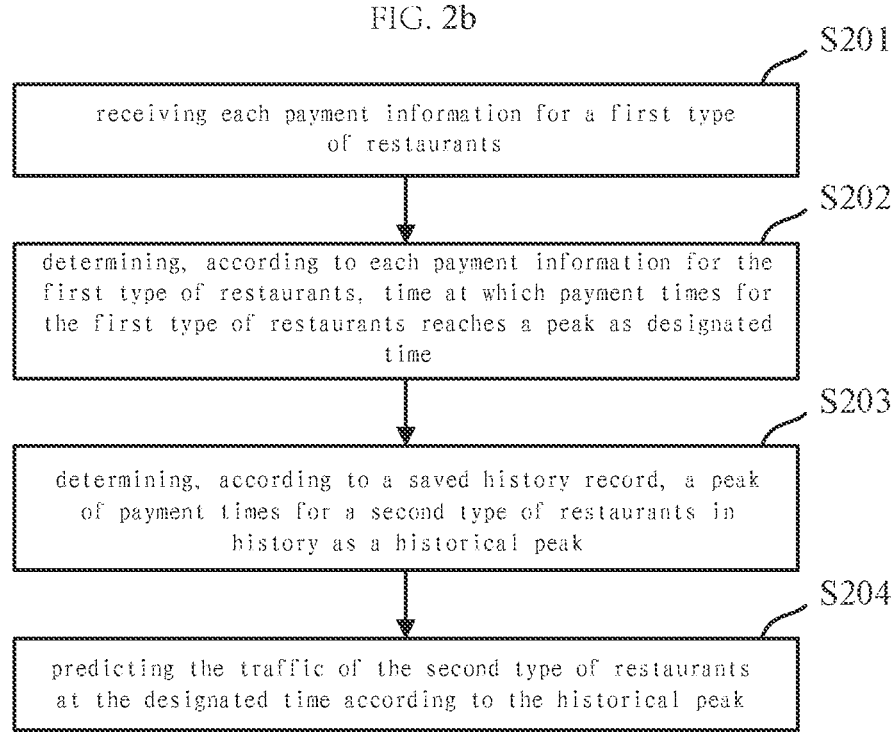
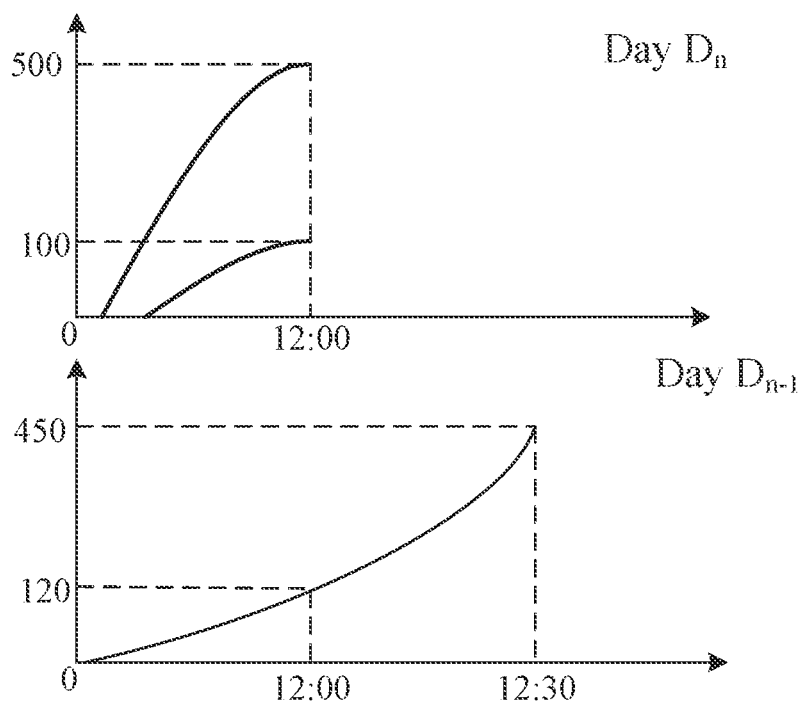

METHOD AND DEVICE FOR PREDICTING TRAFFIC

CROSS-REFERENCE TO RELATED APPLICATIONS

This application is a national stage application of PCT/CN2017/112069, filed Nov. 21, 2017, which claims the benefit of China Patent Application No. 201611055796.6, filed Nov. 25, 2016, the contents of which are incorporated by reference in their entirety for all purposes.

TECHNICAL FIELD

The present application relates to the field of information technology, and in particular, to a method and apparatus for predicting traffic.

BACKGROUND ART

In the contemporary era with rapid development of network services, the load of a server of service providers is increasingly heavy, and it is especially important to determine the traffic in real time.

In the prior art, when determining the traffic of a certain service, it is generally required to count the number of service results generated in a unit time, as the traffic at the current time. If the number of service results generated at a certain time reaches a peak, the time is determined as the arrival time of the service peak.

However, in the actual application scenario, the load of the server is mainly generated during the execution of the service rather than when the service result is generated. That is, the actual generation time of traffic should be at the time when the service starts to be executed, instead of the time when the service result is generated at the end of the execution, the actual arrival time of service peak should be at the time when a large number of services start to be executed, instead of the time when the service result is generated at the end of execution.

Moreover, the execution time of different types of services is also different. In other words, when users perform different types of services, the time required for users to operate is different. Therefore, for a service with short execution time, the service result can be generated faster. According to the method for counting traffic in the prior art, the counted traffic is not too low relative to the actual traffic, and the counted arrival time of service peak is not too lagging relative to the actual arrival time of service peak, and may be within an acceptable range. However, for a service with long execution time, the determined traffic is too low relative to the actual traffic, and there is a big lag in the determined arrival time of service peak relative to the actual arrival time of service peak.

For example, for a simple login, the time at which the server receives the login request is the time at which the service starts to be executed, and after the server receives the login request, as long as the user name and password are verified to be correct, the login can be performed and the login result is generated. According to the method in the prior art, it is acceptable to use the number of login results generated as the traffic at the current time. However, for a service such as booking a train ticket, the user needs to perform a large number of inquiries, and also needs to perform procedures such as submitting an order, performing payment, and the like. If the number of payment results counted at the current time is used as the traffic at the current time, it will obviously make the determined traffic be lower than the actual traffic. This is because that there are still many users who are already performing service procedures of booking tickets, such as inquiring, submitting orders, etc., but have not completed the payment, and payment results will not be generated. If the arrival time of the amount peak generated by payment results is determined as the arrival time of the service peak, the determined arrival time of the service peak will be lagged a lot.

The same is even true for services of the same type, but with different execution manners. For example, for Express service A and Express service B, when using the Express service A to deliver goods, the user needs to pay the freight first, and then carry out the express delivery. Accordingly, the server will count its traffic according to the payment result indicating successful payment uploaded by the courier. However, when using the Express service B to deliver the goods, the user can directly contact the courier by telephone, text message, etc., to instruct the courier to pick up the goods and then carry out the express delivery. After the express reaches the receiver, the payment is performed by the receiver, and the courier can submit the payment result to the server after the payment is successful. Obviously, if the number of payment results received at the current time is used as the traffic, the traffic determined by the prior art is obviously lower than the actual traffic, and if the time at which the number of received payment results reaches the peak is determined as the arrival time of the service peak, it is also lagging for Express service B.

It can be seen that the accuracy of the traffic determined at the current time in the prior art is low, which is undoubtedly very unfavorable for the operation and management of the server.

SUMMARY

The embodiment of the present application provides a method and apparatus for predicting traffic, which are used to solve the problem that the determined traffic of the current time is inaccurate and unfavorable for the operation and management of the server in the prior art.

The present application adopts the following technical solutions:

A method for predicting traffic, comprising: determining time at which payment times for a first service reaches a peak as designated time; determining a peak of payment times for a second service in history as a historical peak according to a saved historical record; and, predicting the traffic of the second service at the designated time according to the historical peak, wherein the first service and the second service belong to the same type of services, the execution manner of the first service is different from that of the second service, the service execution time of the first service is shorter than a preset duration, and the service execution time of the second service is longer than the preset duration.

A method for predicting traffic, comprising: receiving each payment information for a first type of restaurants; determining, according to each payment information for the first type of restaurants, time at which payment times for the first type of restaurants reaches a peak as designated time; determining, according to a saved history record, a peak of payment times for a second type of restaurants in history as a historical peak; and, predicting the traffic of the second type of restaurants at the designated time according to the historical peak, wherein the first type of restaurants are used to provide catering services in which the time from order to payment is shorter than a preset duration, and the second type of restaurants are used to provide catering services in which the time from order to payment is longer than the preset duration.

An apparatus for predicting traffic, comprising: a time determination module for determining time at which payment times for a first service reaches a peak as designated time; a historical peak module for determining a peak of payment times for a second service in history as a historical peak according to a saved historical record; and, a traffic module for predicting the traffic of the second service at the designated time, wherein the first service and the second service belong to the same type of services, the execution manner of the first service is different from that of the second service, the service execution time of the first service is shorter than a preset duration, and the service execution time of the second service is longer than the preset duration.

An apparatus for predicting traffic, comprising: a receiving module for receiving each payment information for a first type of restaurants; a time determination module for determining, according to each payment information for the first type of restaurants, time at which payment times for the first type of restaurants reaches a peak as designated time; a historical peak module for determining, according to a saved history record, a peak of payment times for a second type of restaurants in history as a historical peak; and, a traffic module for predicting the traffic of the second type of restaurants at the designated time according to the historical peak, wherein the first type of restaurants are used to provide catering services in which the time from order to payment is shorter than a preset duration, and the second type of restaurants are used to provide catering services in which the time from order to payment is longer than the preset duration.

In the present application, a server determines the time at which the payment times of the first service reaches the peak as the designated time, and determines the possible traffic of the second service at the current time according to the peak of the payment times of the second service recorded in history. Compared with the prior art, even for the service in which the time at which the payment times reaches the peak is relatively lagging, the present application can more accurately determine the traffic of the service at the current time, thereby providing a more accurate reference for the operation and maintenance procedure of the server.

BRIEF DESCRIPTION OF DRAWINGS

The accompany drawings described herein are intended to provide a further understanding of the present application, and constituted to be a part of the present application. The illustrative embodiments of the present application and the description thereof are for explaining the present application and do not constitute an improper limitation to the present application. In the accompany drawings:

FIG. 2b is a procedure for predicting a restaurant traffic provided by an embodiment of the present application;

FIG. 3 is a schematic diagram of the traffic in an actual application provided by an embodiment of the present application;

DESCRIPTION OF EMBODIMENTS

In order to make objects, technical solutions and advantages of the present application more clearly, it will clearly and completely describe the technical solutions of the present application with reference to the specific embodiments of the present application and the corresponding accompanying drawings in the following. It is apparent that the described embodiments are only a part of the embodiments of the present application, rather than all of the embodiments. Based on the embodiments in the present application, all other embodiments obtained by an ordinary person skilled in the art without creative efforts are within the scope of the present application.

As described above, for services of the same type, but with different execution manners, there is a phenomenon that the current traffic is determined to be inaccurate in the procedure of counting the traffic of the services. Based on this, the embodiment of the present application provides a method for predicting traffic, which tries to accurately determine the traffic of the services with different execution manners at the current time. For the convenience of subsequent description, the services with different execution manners are referred to as the first service and the second service, respectively.

The technical solutions provided by the embodiments of the present application are described in detail below with reference to the accompanying drawings.

Embodiment 1

Figure 1:
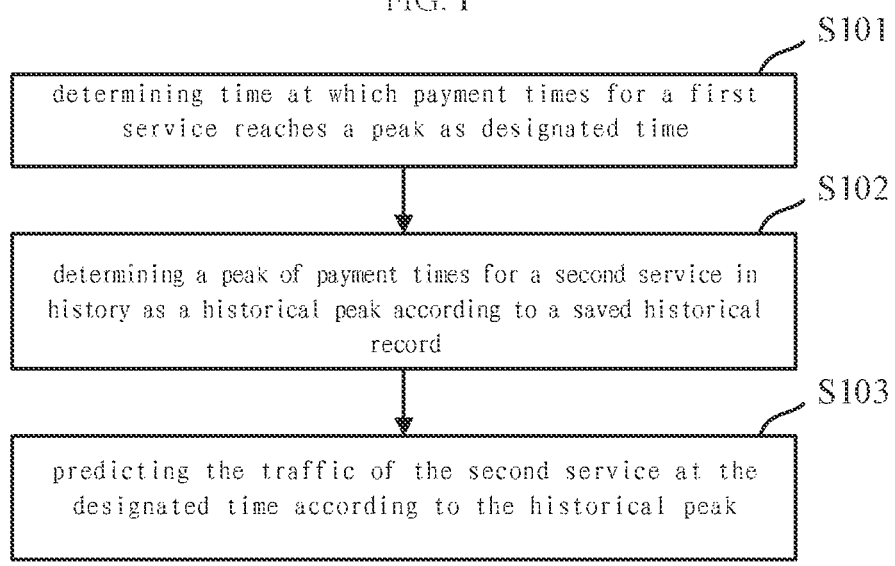
FIG. 1 is a procedure for predicting traffic provided by an embodiment of the present application.

FIG. 1 is a procedure for predicting traffic provided by an embodiment of the present application, which specifically includes the following steps:

S101: determining time at which payment times for the first service reaches a peak as designated time.

In an actual application scenario, the determination of the payment times for the first service may be implemented by a server of the corresponding service provider, where the service provider includes, but is not limited to, a website, a bank, a telecommunication operator, or the like.

The user can use a certain service (namely, the first service) provided by the service provider by sending a service request to the server of the service provider (hereinafter referred to as the server), and accordingly, the user generally pays the corresponding service cost (for example, pays the corresponding amount) for using the service, and the server records the service cost paid by the user. For example, in the procedure of using the express service, the user pays the freight, and the corresponding courier submits the payment result to the express website server, and thus the payment is recorded on the server.

Obviously, with the use of the user, the payment times of the first service will reach the peak at a certain time (i.e., designated time), wherein the peak should be understood as the maximum value of traffic within a certain set time period. In practical applications, there may be more than one peaks in the whole time period, which does not constitute a limitation to the present application.

S102: determining a peak of payment times for the second service in history as a historical peak according to a saved historical record.

The second service is also provided by the corresponding service provider, for example, the Express service B in the foregoing example, which belongs to the same service as the first service, but the two services are executed in different manners. In the embodiment of the present application, for the second service, the determined arrival time of the service peak of the second service has a big lag compared with the actual service peak of the second service.

In other words, because the execution manners between the first and second services are different, the counting of the peak of the payment times for the first service by the server is relatively timely, but the counting of the peak of the payment times for the second service by the server is relatively lagging.

Considering that in the actual application scenario, the server generally records the services that it performs or completes. Specifically, it records the payment times for different services at each time as a historical record, then the peak of the payment times for the second service in history may be determined according to the historical record.

Based on the historical peak of the payment times of the second service, the traffic of the second service at the designated time can be estimated, that is, the following step S103 is performed.

S103: Predicting the actual traffic of the second service at the designated time according to the historical peak.

Wherein, the first service and the second service belong to the same type of services, the execution manner of the first service is different from that of the second service, the service execution time of the first service is shorter than a preset duration, and the service execution time of the second service is longer than the preset duration.

The traffic can be considered as the number of services that the server is executing according to the received service request and does not generate a payment result.

For the second service, since the time when the server determines the payment times of the second service is relatively lagging, that is, before the server counts the payment times of the second service, the actual amount of the second service may have reached the peak, so, according to the peak of the payment times of the second service in history, as the possible traffic of the second service at the designated time, it may be used as a reference for subsequent operations (such as maintenance operations for the server).

Of course, the preset duration is used to quantify the execution time required for the first service and the second service described above. For different service scenarios, the set of preset duration is generally different, which may be specifically set based on requirements of the actual service scenario, and does not constitute a limitation to the present application here.

It can be seen from the above procedure that, when different users use the first service and the second service provided by the service provider, since the execution manners of the first service and the second service are different, the execution time of the first service is shorter than the execution time of the second service. In this case, for the first service, the payment times will preferentially reaches the peak, and for the second service, since the execution time of the second service is longer, it causes the counting of the payment times for the second service to be relatively lagging, but in fact, the traffic of the second service may have reached the peak. Therefore, in order to determine the actual traffic of the second service more accurately, in the present application, the server will determine the time at which the payment times of the first service reaches the peak as the designated time, and determine the possible traffic of the second service at the current time based on the peak of the payment times of the second service recorded in history.

Compared with the prior art, even for the service in which the time at which the payment times reaches the peak is lagging, the present application can more accurately predict the traffic of the service at the current time, thereby providing a more accurate reference for the operation and maintenance procedure of the server.

For the foregoing procedure for determining the traffic, specifically, predicting the traffic of the second service at the designated time according to the historical peak, including: determining the payment times for the second service at the designated time as the current times, determining a historical time corresponding to the designated time in a historical time period, determining, according to the saved historical record, the payment times for the second service at the historical time as the historical times, comparing the current times with the historical times, and determining, according to the comparison result and the historical peak, the traffic of the second service at the designated time.

Taking the above-mentioned express service as an example for detailed description, for the Express service B (i.e., the second service), since the freight of the express is paid after the receiver receives the express, the time when the payment times received by the server reaches the peak is relatively lagging (here, the procedure from the start of express delivery to the completion of payment by the receiver can be regarded as the procedure in which the second service is being executed) under this scenario. Obviously, the traffic being executed may have reached its peak before the payment times reaches the peak. Therefore, the traffic of Express service B at 12:00 can be determined by using the historical peak.

It is assumed here that 12:00 is used as the designated time, through the historical record, it can be determined that the payment times for the Express service B in lunch time period on the previous day appears at 12:30, and the value is 500 (times), so the historical peak can be determined as the peak of payment times for the Express service B at 12:00.

It should be noted that the traffic of the second service at the designated time determined by using the above method is essentially an estimated value obtained according to the historical record, but the historical peak of payment times for the second service in history is not consistent. In other words, the historical peak may be higher than the traffic of the second at the current time, or may be lower than the traffic of the second at the current time. Then, in order to determine the traffic of the second service more accurately, the determined historical peak can be adjusted numerically. Specifically, determining the traffic of the second service at the designated time according to the comparison result and the historical peak including: determining a difference between the current times and the historical times, determining a weight corresponding to the difference according to a preset corresponding relationship between the difference and the weight, and predicting the traffic of the second service at the designated time according to the weight and the historical peak.

Following the above example, assuming that the payment times that the server has counted is 500 (i.e., the foregoing current times) for the Express service B at 12:00, and the payment times that the server has counted at 12:00 on the previous day is 400 (i.e., the foregoing historical times), obviously, the payment times that the server has counted on the previous day is less than the payment times that the server has counted currently, so the difference can be determined to be 100, then it indicates that the traffic that the express service B is delivering express is likely to be greater than that of the previous day. Therefore, assuming that the weight may be determined to be 0.2, then based on this, the historical peak can be adjusted, that is, 500*(1+0.2)=600, and thus, it is determined that the number of Express services B in the express delivery is 600 at the time of 12:00 on the same day (that is, the subsequent server can count the number of payment as 600).

The above examples are only for explaining the method for predicting the traffic described in the embodiments of the present application, and should not be construed as limiting the present application.

In addition to the above scenarios, at present, an application of the restaurant recommendation category (subsequently referred to as recommended application) is widely used by users. Through the recommended application, the user can know the basic information and the dining situation of various types of restaurants, and can use the recommended application to pay.

In a practical application, restaurants are divided into different types: the fast food type of restaurants and the dinner type of restaurants. Among them, the dining manner of a fast food restaurant is to pay before dinning, while the dining manner of a dinner restaurant is to pay after dinning. Thus, the server in the background of the recommended application can receive payment information sent by different types of restaurants, and use this to count the dining situation of each restaurant. However, it is because of the different dinning manners of the two restaurants, then, for the dinner restaurant, since the user pays after finishing the dinning, so it is generally lagging for the server in the background of the recommended application to obtain the payment information of the dinner restaurant, so that the user who uses the recommended application cannot accurately know the current dining situation of the dinner restaurant.

Therefore, the method for predicting the traffic provided in the embodiment of the present application is also applicable to the scenario of counting dining situations of the restaurant. Specifically, as shown in FIG. 2a, which is the architecture diagram in the scenario, the server in the background of the recommended application (hereinafter, referred to as the server) receives the payment information sent by different types of restaurants, and generates corresponding dinning situations hereby.

Figure 2A:
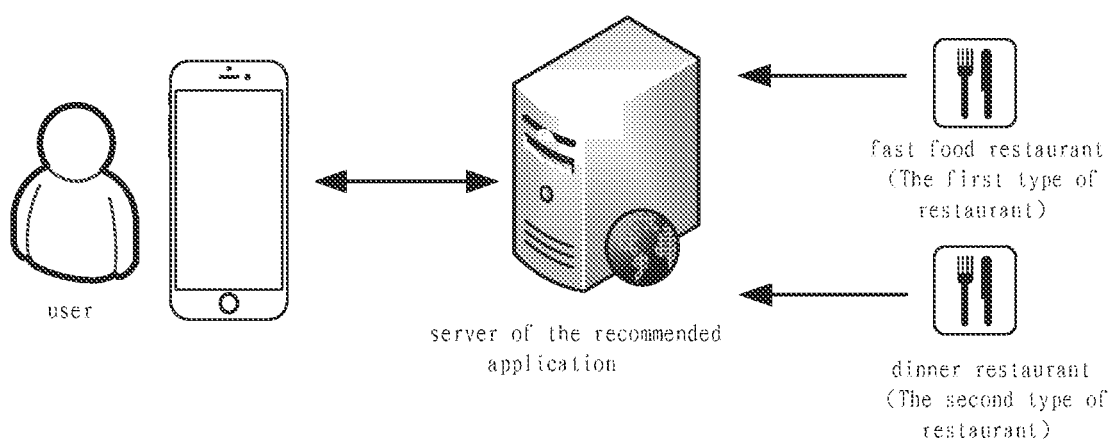
FIG. 2a is an architecture on which a procedure for predicting a restaurant traffic provided by an embodiment of the present application is based.

Based on the architecture shown in FIG. 2a, the method for predicting the traffic in this scenario is shown in FIG. 2b, which specifically includes the following steps:

S201: receiving each payment information corresponding to the first type of restaurants.

Wherein, the first type of restaurants are used to provide catering services in which the time from order to payment is shorter than the preset duration, such as: the fast food type of restaurants, the second type of restaurants are used to provide catering services in which the time from order to payment is longer than the preset duration, such as: the dinner type of restaurants.

It can be seen that, since the dining manner for the first type of restaurants is to pay before dinning, the server will receive the payment information of the first type of restaurant in time.

S202: determining, according to each payment information for the first type of restaurants, time at which the payment times for the first type of restaurants reaches a peak as designated time.

In practical applications, it is generally possible to determine the time at which the payment times corresponding to the first type of restaurants reaches the peak in some set time periods, and the set time period here may be, for example, lunch time period (11:30~13:30), supper time period (17:00~20:00), etc., the time when the payment times for the first type of restaurant reaches the peak may be, for example: 12:00 within lunch time period, at which the payment times reaches the peak. Of course, this does not constitute a limitation to the present application.

Apparently, the payment times of the first type of restaurant reaches the peak, which also indicates that the dining situation (e.g., dining popularity) of the first type of restaurants reaches peak.

S203: determining a peak of payment times for the second type of restaurants in history as a historical peak according to a saved historical record.

Due to the difference in the dinning manner with the first type of restaurant, the counting of the payment times for the second type of restaurant by the server is generally only after the user finishes the dinning, that is, the counting on the payment times appears lag. Therefore, in order to determine the designated time (e.g., 12:00 in the previous example), for the payment times of the second type of restaurant, the peak of payment times in history will be determined for reference, for example, the peak of payment times of the second type of restaurants in the lunch time period on the previous day is determined as the historical peak.

S204: Predicting the traffic of the second type of restaurants at the designated time according to the historical peak.

Following the above example, the user may be in a dinning state (but does not pay) for the second restaurant at 12:00, and the payment times of the second type of restaurants may reach the peak after the user currently dinning finishes the dinning, then the historical peak according to the previous day can be used as the actual dinning situation (i.e., traffic) of the same day.

Before predicting the traffic of the second type of restaurants at the designated time according to the historical peak, the method further comprises: receiving each payment information corresponding to the second type of restaurants, and then predicting the traffic of the second type of restaurants at the designated time according to the historical peak, specifically including: determining, according to each payment information corresponding to the second type of restaurants, the payment times for the second type of restaurants at the designated time as the current times, determining a historical time corresponding to the designated time in the historical time period, determining, according to the saved historical record, the payment times for the second type of restaurants at the historical time as the historical times, comparing the current times with the historical times, and predicting the traffic of the second type of restaurants at the designated time according to the comparison result and the historical peak.

More specifically, determining the traffic of the second type of restaurants at the designated time according to the comparison result and the historical peak, specifically including: determining a difference between the current times and the historical times, determining a weight corresponding to the difference according to a preset corresponding relationship between the difference and the weight, and predicting the traffic of the second type of restaurants at the designated time according to the weight and the historical peak.

For example, as shown in FIG. 3, it shows the statistical value of the payment times for the first type of restaurant A and the second type of restaurant B by the server. Assuming that, during the lunch time period of the day $D_n$ (which can be understood as the same day), the payment times of restaurant A reaches the peak of 500 at 12:00. At the same time, the payment times of restaurant B is 100 (the current times). Obviously, considering the dining manner of restaurant B, there are still a certain number of users who are in the state of dinning without paying, so in order to determine the traffic of restaurant B at 12:00, please refer to the peak of payment times of restaurant B during lunch time period on the day $D_{n-1}$. As can be seen from FIG. 3, the payment times of restaurant B reaches the peak 450 at 12:30 on the day $D_{n-1}$.

In order to more accurately estimate the peak of payment times of restaurant B at 12:00 on the day $D_n$, it can determine the payment times of restaurant B at 12:00 on the day $D_{n-1}$, that is, 120 (history times). Then, the difference between the current times and the historical times is −20, and then the weight corresponding to the difference can be determined. It is assumed that the weight of the difference in the interval of [−1, −20] is −0.2, so it can determine that the peak of payment times of restaurant B is: 450*(1−0.2)=360, at 12:00 on the day $D_n$.

Therefore, in this example, the traffic of restaurant B at 12:00 on the day $D_n$ is determined as 360, which means that the peak of payment times of restaurant B during lunch time period on day $D_n$ is expected to be 360.

In actual application scenarios, the server may display the popularity value of each restaurant to the user who uses the recommended application based on the determined traffic, and the method further includes: according to the determined traffic and a preset rule, determining popularity value of the second type of restaurants at the designated time and displaying the popularity value.

As a manner in the embodiment of the present application, the popularity value of the restaurant may be determined on the basis of the traffic in combination with a popularity coefficient. Of course, the popularity value also can be displayed in the manner of star-level, for example, if the traffic exceeds 150, the popularity value with five-star is displayed, and the above manners do not constitute a limitation to the embodiments of the present application.

The technical carrier involved in the payment in the embodiments of the present application may include, for example, Near Field Communication (NFC), WIFI, 3G/4G/5G POS card swiping technology, two-dimensional code scanning technology, barcode scanning technology, Bluetooth, infrared, Short Message Service (SMS), Multimedia Message Service (MMS), etc.

Figure 5:
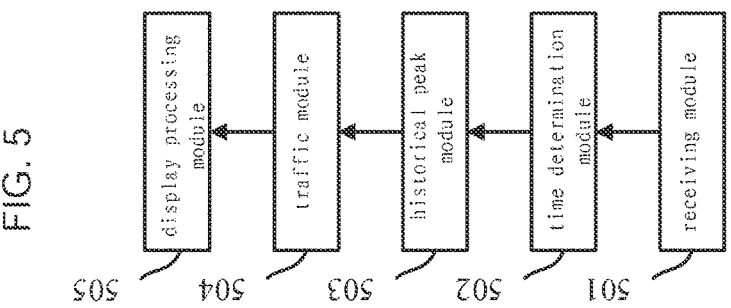
FIG. 5 is a schematic structural diagram of another apparatus for predicting traffic provided by an embodiment of the present application.

The above is the methods for predicting the traffic provided by the embodiments of the present application. Based on the same idea, the present application further provides apparatuses for predicting the corresponding traffic, as shown in FIG. 4 and FIG. 5.

Figure 4:
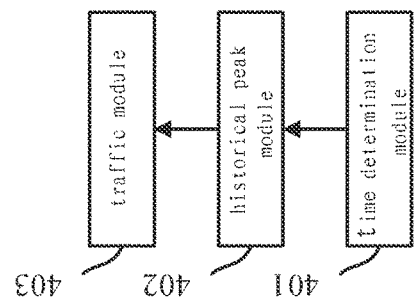
FIG. 4 is a schematic structural diagram of an apparatus for predicting traffic provided by an embodiment of the present application.

FIG. 4 is a schematic structural diagram of an apparatus for predicting traffic provided by an embodiment of the present application, specifically including:

a time determining module 401 for determining time at which payment times for a first service reaches a peak as designated time;

a historical peak module 402 for determining a peak of payment times for a second service in history as a historical peak according to a saved historical record; and a traffic module 403 for predicting the traffic of the second service at the designated time, wherein the first service and the second service belong to the same type of services, the execution manner of the first service is different from that of the second service, the service execution time of the first service is shorter than a preset duration, and the service execution time of the second service is longer than the preset duration.

The traffic module 403 determines payment times for the second service at the designated time as current times, determines historical time corresponding to the designated time in a historical time period, determines the payment times for the second service at the historical time as historical times according to the saved historical record, compares the current times with the historical times, and predicts the traffic of the second service at the designated time according to the comparison result and the historical peak.

The traffic module 403 determines a difference between the current times and the historical times, determines a weight corresponding to the difference according to a preset corresponding relationship between the difference and the weight, and predicts the traffic of the second service at the designated time according to the weight and the historical peak.

FIG. 5 is a schematic structural diagram of another apparatus for predicting traffic provided by an embodiment of the present application, specifically including:

a receiving module 501 for receiving each payment information for a first type of restaurants;

a time determination module 502 for determining, according to each payment information for the first type of restaurants, time at which payment times for the first type of restaurants reaches a peak as designated time;

a historical peak module 503 for determining, according to a saved history record, a peak of payment times for a second type of restaurants in history as a historical peak; and a traffic module 504 for predicting the traffic of the second type of restaurants at the designated time according to the historical peak, wherein the first type of restaurants are used to provide catering services in which the time from order to payment is shorter than a preset duration, and the second type of restaurants are used to provide catering services in which the time from order to payment is longer than the preset duration.

The receiving module 501 receives each payment information for the second type of restaurants, and the traffic module 504 determines payment times for the second type of restaurants at the designated time as current times according to each payment information for the second type of restaurants, determines historical time corresponding to the designated time in a historical time period, determines the payment times for the second type of restaurants at the historical time as historical times according to the saved historical record, compares the current times with the historical times, and predicts the traffic of the second type of restaurants at the designated time according to the comparison result and the historical peak.

The traffic module 504 determines a difference between the current times and the historical times, determines a weight corresponding to the difference according to a preset corresponding relationship between the difference and the weight, and predicts the traffic of the second type of restaurants at the designated time according to the weight and the historical peak.

The apparatus further comprises: a display processing module 505 for determining popularity value of the second type of restaurants at the designated time according to the predicted traffic and a preset rule, and displaying the popularity value.

In the 1990s, it can clearly distinguish whether the improvement to a technology is improvement in hardware (for example, the improvement in a circuit structure such as diode, transistor, switch, etc.) or improvement in software (for example, the improvement in a method flow). However, with the development of technology, the improvement to many method flows in nowadays can be regarded as direct improvement in hardware circuit structure. Designers almost always get the corresponding hardware circuit structure by programming the improved method flow into the hardware circuit. Therefore, it cannot be said that the improvement of a method flow cannot be implemented by hardware entity modules. For example, the Programmable Logic Device (PLD) (e.g., Field Programmable Gate Array (FPGA)) is one of such integrated circuit, in which the logic function is determined by programming on the device by the user. Designers program voluntarily to "integrate" a digital system on a single PLD without asking the chip manufacturer to design and fabricate a dedicated integrated circuit chip. Moreover, nowadays, instead of manually fabricating the integrated circuit chip, this programming is mostly implemented by using "logic compiler" software, which is similar to the software compiler used in writing during programming development, but it requires that the original code before compiling has to be written in a specific programming language. This is called Hardware Description Language (HDL). However, there is not only one kind of HDL, but there are many kinds of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. Currently, VHDL (Very-High-Speed Integrated Circuit Hardware Description Language) and Verilog are the most commonly used.

Those skilled in the art should also appreciate that the hardware circuit for implementing the logic method flow can be easily obtained by simply programming the method flow with a few hardware description languages described above and programming it into the integrated circuit.

The controller can be implemented in any suitable manner, for example, the controller can take the form of, for example, microprocessor or processor and computer readable medium storing computer readable program code (eg, software or firmware) executable by the (micro)processor, logic gate, switch, application specific integrated circuit (ASIC), programmable logic controller, and embedded microcontroller, examples of controllers include, but are not limited to, the following microcontrollers: ARC 625D, Atmel AT91SAM, Microchip PIC18F26K20 and Silicone Labs C8051F320, the memory controller can also be implemented as part of the control logic of the memory. Those skilled in the art also know that the controller can achieve the same function in the form of logic gate, switch, ASIC, programmable logic controller, embedded microcontroller and the like entirely by logically programming the steps of method, in addition to implementing the controller in pure computer readable program codes. Such a controller can therefore be considered as a hardware part, and the means for implementing various functions included therein can also be considered as a structure within a hardware part. Or, even the means for implementing various functions can be considered as both of a software module for implementing a method and the structure within the hardware component.

The system, apparatus, module or unit illustrated in the above embodiments may be specifically implemented by a computer chip or an entity, or by a product having a certain function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when describing the above apparatus, the apparatus is divided into various units in functions to describe respectively. Of course, the function of each unit may be implemented in the same one or multiple softwares and/or hardwares when implementing the present application. Those skilled in the art should understand that embodiments of the present invention can be provided as a method, system, or computer program product. Accordingly, the present invention may take the form of an entire hardware embodiment, an entire software embodiment, or an embodiment with the combination of software and hardware. Moreover, the invention can take the form of a computer program product embodied on one or more computer-usable storage media (including, but not limited to, magnetic disk memory, CD-ROM, optical memory, etc.) in which computer usable program codes are contained.

The present invention has been described with reference to flowcharts and/or block diagrams of the method, device (system), and computer program product according to embodiments of the invention. It should be understood that each flow and/or block of the flowcharts and/or block diagrams, and the combination of flows and/or blocks of the flowcharts and/or block diagrams may be implemented by computer program instructions. These computer program instructions can be provided to a processor of a general purpose computer, a special-purpose computer, an embedded processor, or other programmable data processing devices to produce a machine, such that means for implementing the functions specified in one or more flows of the flowcharts and/or one or more blocks of the block diagrams are generated by instructions executed by a processor of a computer or other programmable data processing device.

These computer program instructions can also be stored in a computer readable memory that can guide a computer or other programmable data processing device to operate in a particular manner, such that the instructions stored in the computer readable memory generate an article of manufacture comprising the instruction means. The instruction means implements the functions specified in one or more flows of the flowcharts and/or one or more blocks of the block diagrams.

These computer program instructions can also be loaded onto a computer or other programmable data processing device, such that a series of operational steps are performed on the computer or other programmable device to generate computer-implemented processing, and thus the instructions executed on the computer or other programmable data processing device provides steps for implementing the functions specified in one or more flows of the flowcharts and/or one or more blocks of the block diagrams.

In a typical configuration, a computing device includes one or more processors (CPUs), input/output interfaces, network interfaces, and memory.

The memory may include the form of non-persistent memory, random access memory (RAM), and/or non-volatile memory, etc., in a computer readable medium, such as read only memory (ROM) or flash RAM. Memory is an example of the computer readable medium.

The computer readable medium includes permanent and non-persistent, removable and non-removable media, and can achieve the information storage by any method or technology. The information can be computer readable instructions, data structures, modules of programs, or other data. Examples of computer storage medium include, but are not limited to, phase change memory (PRAM), static random access memory (SRAM), dynamic random access memory (DRAM), other types of random access memory (RAM), read-only memory (ROM), electrically erasable programmable read only memory (EEPROM), flash memory or other memory technology, read-only optical disk read-only memory (CD-ROM), digital versatile optical disk (DVD) or other optical storage, magnetic cartridge tape, magnetic tape-magnetic disk storage or other magnetic storage device, or any other non-transportable media, which can be used to store information that can be accessed by a computing device. As defined herein, computer readable media does not include transitory media, such as modulated data signals and carriers.

It should also be illustrated that, the terms "comprise", "include" or any other variations is intended to cover a non-exclusive inclusion, such that a procedure, method, item, or device including a series of elements not only includes those elements, but also includes other elements not explicitly listed, or includes elements that are inherent to such a procedure, method, item, or device. An element defined by the phrase "comprise(s) a . . . " does not exclude the presence of additional same elements in the procedure, method, item, or device including the elements without more limitations.

Those skilled in the art should understand that embodiments of the present application can be provided as a method, system, or computer program product. Accordingly, the present invention may take the form of entire hardware embodiments, entire software embodiments, or embodiments with the combination of software and hardware. Moreover, the present application can take the form of a computer program product implemented on one or more computer-usable storage media (including, but not limited to, magnetic disk memory, CD-ROM, optical memory, etc.) in which computer usable program codes are contained.

The present application can be described in general context of computer-executable instructions executed by a computer, such as program modules. Generally, the program modules include routines, programs, objects, components, data structures, or the like that perform particular tasks or realize particular abstract data types. The present application can also be practiced in distributed computing environments in which tasks are performed by remote processing devices that are connected through a communication network. In distributed computing environments, the program modules can be located in both local and remote computer storage media including storage devices.

Each embodiment in the specification is described in a progressive manner, the same or similar parts in each embodiment are for reference to each other, and each embodiment focuses on differences from other embodiments. In particular, for the system embodiment, since it is basically similar to the method embodiment, the description is relatively simple, and the relevant parts can be referred to the description of the method embodiment.

The above description is only embodiments of the present application and is not intended to limit the present application. Various alterations and changes can be made to the present application for those skilled in the art. Any modifications, equivalents, improvements, etc., made within the spirit and principles of the present application should be included within the scope of the claims of the present application.

What is claimed is:

1. A method for predicting traffic comprising:
   determining a time at which payment times for a first service reaches a peak as a designated time;
   determining a peak of payment times for a second service in history as a historical peak according to a saved historical record; and
   predicting a traffic of the second service at the designated time according to the historical peak, wherein the first service and the second service belong to the same type of services, the execution manner of the first service is different from that of the second service, a service execution time of the first service is shorter than a preset duration, and a service execution time of the second service is longer than the preset duration, wherein predicting the traffic of the second service at the designated time according to the historical peak specifically comprises:
   determining payment times for the second service at the designated time as current times;
   determining a historical time corresponding to the designated time in a historical time period;
   determining, according to the saved historical record, the payment times for the second service at the historical time as historical times;
   comparing the current times with the historical times, and predicting the traffic of the second service at the designated time according to a comparison result and the historical peak;
      determining a difference between the current times and the historical times;
      determining a weight corresponding to the difference according to a preset corresponding relationship between the difference and the weight; and
      predicting the traffic of the second service at the designated time according to the weight and the historical peak.

2. A method for predicting traffic comprising:
   receiving each payment information for a first type of restaurants;
   determining, according to each payment information for the first type of restaurants, time at which payment times for the first type of restaurants reaches a peak as a designated time;
   determining, according to a saved history record, a peak of payment times for a second type of restaurants in history as a historical peak; and
   predicting a traffic of the second type of restaurants at the designated time according to the historical peak, wherein the first type of restaurants is used to provide catering services in which a time from order to payment is shorter than a preset duration, and the second type of restaurants are used to provide catering services in which the time from order to payment is longer than the preset duration; and
   determining a popularity value of the second type of restaurants at the designated time according to the predicted traffic and a preset rule; and
   displaying the popularity value.

3. The method according to claim 2, wherein before predicting the traffic of the second type of restaurants at the designated time according to the historical peak, the method further comprises:
receiving each payment information for the second type of restaurants, and
predicting the traffic of the second type of restaurants at the designated time according to the historical peak specifically comprising:
determining payment times for the second type of restaurants at the designated time as current times;
determining historical time corresponding to the designated time in a historical time period;
determining, according to the saved historical record, the payment times for the second type of restaurants at the historical time as historical times; and
comparing the current times with the historical times, and predicting the traffic of the second type of restaurants at the designated time according to a comparison result of the current time and the historical times and the historical peak.

4. The method according to claim 3, wherein predicting the traffic of the second type of restaurants at the designated time according to a comparison result and the historical peak specifically comprises:
determining a difference between the current times and the historical times;
determining a weight corresponding to the difference according to a preset corresponding relationship between the difference and the weight; and
predicting the traffic of the second type of restaurants at the designated time according to the weight and the historical peak.

5. An apparatus for predicting traffic comprising:
a time determination module for determining time at which payment times for a first service reaches a peak as a designated time;
a historical peak module for determining a peak of payment times for a second service in history as a historical peak according to a saved historical record; and
a traffic module for predicting a traffic of the second service at the designated time, wherein the first service and the second service belong to the same type of services, an execution manner of the first service is different from that of the second service, a service execution time of the first service is shorter than a preset duration, and a service execution time of the second service is longer than the preset duration, wherein the traffic module determines payment times for the second service at the designated time as current times;
determines historical time corresponding to the designated time in a historical time period, determines the payment times for the second service at the historical time as historical times according to the saved historical record, compares the current times with the historical times, and predicts the traffic of the second service at the designated time according to a result of the comparison and the historical peak, and where the traffic module determines a difference between the current times and the historical times, determines a weight corresponding to the difference according to a preset corresponding relationship between the difference and the weight, and predicts the traffic of the second service at the designated time according to the weight and the historical peak.

6. An apparatus for predicting traffic comprising:
a receiving module for receiving each payment information for a first type of restaurants, wherein the receiving module receives each payment information for a second type of restaurants;
a time determination module for determining, according to each payment information for the first type of restaurants, time at which payment times for the first type of restaurants reaches a peak as a designated time;
a historical peak module for determining, according to a saved historical record, a peak of payment times for a second type of restaurants in history as a historical peak; and
a traffic module for predicting a traffic of the second type of restaurants at the designated time according to the historical peak, wherein the first type of restaurants is used to provide catering services in which the time from order to payment is shorter than a preset duration, and the second type of restaurants are used to provide catering services in which the time from order to payment is longer than the preset duration, and wherein the traffic module determines payment times for the second type of restaurants at the designated time as current times according to each payment information for the second type of restaurants, determines historical time corresponding to the designated time in a historical time period, determines the payment times for a second type of restaurants at the historical time as historical times according to the saved historical record, compares the current times with the historical times, and predicts the traffic of the second type of restaurants at the designated time according to a result of the comparison and the historical peak.

7. The apparatus according to claim 6, wherein the traffic module determines a difference between the current times and the historical times, determines a weight corresponding to the difference according to a preset corresponding relationship between the difference and the weight, and predicts the traffic of the second type of restaurants at the designated time according to the weight and the historical peak.

8. The apparatus according to claim 6, wherein the apparatus further comprises:
a display processing module for determining popularity value of the second type of restaurants at the designated time according to the predicted traffic and a preset rule, and displaying the popularity value.

9. The apparatus according to claim 6, wherein the apparatus further comprises:
a display processing module for determining popularity value of the second type of restaurants at the designated time according to the predicted traffic and a preset rule, and displaying the popularity value.

10. The apparatus according to claim 6, wherein the apparatus further comprises:
a display processing module for determining popularity value of the second type of restaurants at the designated time according to the predicted traffic and a preset rule, and displaying the popularity value.

* * * * *